(12) United States Patent
Zhu et al.

(10) Patent No.: US 12,524,843 B2
(45) Date of Patent: Jan. 13, 2026

(54) DENOISING METHOD, APPARATUS, ELECTRONIC DEVICE AND MEDIUM

(71) Applicant: INTELLINDUST INFORMATION TECHNOLOGY (SHENZHEN) CO., LTD, Shenzhen (CN)

(72) Inventors: Caizhi Zhu, Shenzhen (CN); Lin Wang, Shenzhen (CN); Xiao Zhou, Shenzhen (CN); Peizhe Ru, Shenzhen (CN); Yaohui Sun, Shenzhen (CN)

(73) Assignee: INTELLINDUST INFORMATION TECHNOLOGY (SHENZHEN) CO., LTD, Shenzhen (CN)

( * ) Notice: Subject to any disclaimer, the term of this patent is extended or adjusted under 35 U.S.C. 154(b) by 399 days.

(21) Appl. No.: 18/024,922

(22) PCT Filed: Dec. 26, 2022

(86) PCT No.: PCT/CN2022/142016
§ 371 (c)(1),
(2) Date: Mar. 6, 2023

(87) PCT Pub. No.: WO2023/125440
PCT Pub. Date: Jul. 6, 2023

(65) Prior Publication Data
US 2024/0296525 A1    Sep. 5, 2024

(30) Foreign Application Priority Data
Dec. 31, 2021    (CN) .......................... 202111663744.8

(51) Int. Cl.
G06T 5/70 (2024.01)
G06T 5/60 (2024.01)
G06T 7/194 (2017.01)

(52) U.S. Cl.
CPC ................. *G06T 5/70* (2024.01); *G06T 5/60* (2024.01); *G06T 7/194* (2017.01); *G06T 2207/20081* (2013.01); *G06T 2207/20084* (2013.01)

(58) Field of Classification Search
CPC ....................................................... G06T 5/60
See application file for complete search history.

(56) References Cited

U.S. PATENT DOCUMENTS

2019/0026600 A1    1/2019  Bagherinezhad et al.
2020/0364834 A1*  11/2020  Ferrés ........................ G06T 5/60
(Continued)

FOREIGN PATENT DOCUMENTS

CN    109064428 A    12/2018
CN    109360192 A    2/2019
(Continued)

*Primary Examiner* — Akwasi M Sarpong
*Assistant Examiner* — Michael L Burleson
(74) *Attorney, Agent, or Firm* — Cozen O'Connor

(57) ABSTRACT

The embodiments of the present application provide a denoising method, apparatus, electronic device and medium, which relates to the technical field of image processing. The method comprises: inputting an image to be processed into an image denoising model, which is a model obtained by training a convolutional neural network model based on a preset training set, wherein the preset training set includes multiple groups of annotation data and sample data corresponding to each group of annotation data, and each group of annotation data includes multiple noiseless images obtained by performing motion simulation processing on one reference noiseless image, and the sample data corresponding to the group of annotation data includes images obtained by superimposing noise to the multiple noiseless images respectively; acquiring denoised image data output by the image denoising model; converting the image data into an image, to obtain a denoised image corresponding to
(Continued)

the image to be processed. This can effectively solve the problem of ghost existed in the denoised image.

13 Claims, 7 Drawing Sheets

(56) References Cited

U.S. PATENT DOCUMENTS

2021/0125310 A1\*   4/2021  Pu ........................... G06N 3/04
2021/0390668 A1    12/2021  Ren et al.

FOREIGN PATENT DOCUMENTS

| CN | 110136147 A | 8/2019 |
| CN | 106910247 B | 10/2020 |
| CN | 113850741 A | 12/2021 |
| CN | 108986047 B | 3/2022 |
| CN | 114331902 A | 4/2022 |
| IN | 110163827 A | 8/2019 |
| IN | 111353948 A | 6/2020 |

\* cited by examiner

DENOISING METHOD, APPARATUS, ELECTRONIC DEVICE AND MEDIUM

The present application claims the priority to a Chinese patent present application No. 202111663744.8, filed with the China National Intellectual Property Administration on Dec. 31, 2021 and entitled "denoising method, apparatus, electronic device and medium", which is incorporated herein by reference in its entirety.

TECHNICAL FIELD

The present application relates to the technical field of image processing, and in particular to a denoising method, apparatus, electronic device and medium.

BACKGROUND

At present, image denoising or video denoising mainly adopts a multi-frame denoising method, that is, obtaining multiple frames of images before and after the image to be denoised, and performing the method of superimposing an average value on the obtained multiple frames of images for denoising.

When capturing an image or video, the capture device may shake, and the object being shot may also be a moving object. Therefore, this denoising method of superimposing an average value on multiple frames of images will lead to a ghost in the denoised image or video.

SUMMARY

The purpose of the embodiments of the present application is to provide a denoising method, apparatus, electronic device and medium, so as to solve the problem of ghost caused by denoising videos or images. Specifically, the technical solutions are as follows:

In a first aspect, an embodiment of the present application provides a denoising method, which includes:

inputting an image to be processed into an image denoising model, wherein the image denoising model is a model obtained by training a convolutional neural network model based on a preset training set, and the preset training set includes multiple groups of annotation data and sample data corresponding to each group of annotation data: wherein, each group of annotation data includes multiple noiseless images obtained by performing motion simulation processing on one reference noiseless image, and the sample data corresponding to the group of annotation data includes images obtained by superimposing noise to the multiple noiseless images respectively: acquiring denoised image data output by the image denoising model: converting the image data into an image, to obtain a denoised image corresponding to the image to be processed.

In one possible implementation, the preset training set is obtained by the following operations:

collecting multiple reference noiseless images: for each of the reference noiseless images, extracting multiple images that have a same shape, a same area, and an overlapping region, but are not completely identical, from the reference noiseless image, and taking the extracted images as one group of annotation data: superimposing noise to the multiple images included in each group of annotation data respectively, to obtain the sample data corresponding to each group of annotation data: generating the preset training set from the obtained multiple groups of annotation data and the sample data corresponding to each group of annotation data.

In one possible implementation, the preset training set is obtained by the following operations:

collecting multiple reference noiseless images: selecting two images each time from the multiple reference noiseless images as a foreground image and a background image respectively: cropping the background image according to a first specified shape and a first specified size: cropping the foreground image according to the first specified shape and a second specified size, and masking the cropped foreground image to obtain a foreground image of a second specified shape: superimposing the foreground image of the second specified shape on the cropped background image at a starting position of the cropped background image, translating the foreground image of the second specified shape on the background image in a preset direction at a preset speed, and taking images at multiple moments in the translation process as one group of annotation data: superimposing noise to the multiple images included in each group of annotation data respectively, to obtain the sample data corresponding to each group of annotation data: generating the preset training set from the obtained multiple groups of annotation data and the sample data corresponding to each group of annotation data.

In one possible implementation, before generating the preset training set from the obtained multiple groups of annotation data and the sample data corresponding to each group of annotation data, the method further includes: selecting two images each time from the multiple reference noiseless images as a foreground image and a background image respectively: cropping the background image according to a first specified shape and a first specified size: cropping the foreground image according to the first specified shape and a second specified size, and masking the cropped foreground image to obtain a foreground image of a second specified shape, wherein the second specified size is less than the first specified size: superimposing the foreground image of the second specified shape on the background image at a starting position of the background image, translating the foreground image of the second specified shape on the background image in a preset direction at a preset speed, and taking images at multiple moments in the translation process as one group of annotation data.

In one possible implementation, for each of the reference noiseless images, extracting the multiple images that have a same shape, a same area, and an overlapping region, but are not completely identical, from the reference noiseless image, and taking the extracted multiple images as the group of annotation data, includes: for each of the reference noiseless images, randomly selecting one position from the reference noiseless image as a starting crop coordinate: cropping the reference noiseless image at the starting crop coordinate to obtain a square having a specified side length as one cropped image: randomly offsetting the starting crop coordinate to obtain a next crop coordinate, and cropping the reference noiseless image at the next crop coordinate to obtain a square having a specified side length as one cropped image: obtaining one cropped image by cropping the reference noiseless image each time the crop coordinate is randomly offset, until a preset number of cropped images are obtained, and taking the preset number of cropped images as the group of annotation data.

In one possible implementation, collecting multiple reference noiseless images includes: collecting multiple static RAW images captured by a capture device with a photosensibility set to a lowest value: for each of the static RAW images, processing the static RAW image with different brightness values to obtain the multiple reference noiseless images.

In one possible implementation, the image denoising model is trained by the following operations: after splicing a first frame of image in one group of sample data included in the preset training set with itself, inputting the spliced image into the convolutional neural network model, and processing the spliced image successively by a first convolutional network and a second convolutional network included in the convolutional neural network model: acquiring an intermediate denoised image output by the first convolutional network and a final denoised image output by the second convolutional network: calculating a loss function value based on the final denoised image and the first frame of image: determining whether the convolutional neural network model converges according to the loss function value: if the convolutional neural network model does not converge, adjusting parameters of the convolutional neural network model based on the loss function value, and splicing a next frame of image in the group of sample data with the intermediate denoised image output by the first convolutional network last time, and returning to the operation of inputting the spliced image into the convolutional neural network model until the convolutional neural network model converges, then taking the trained convolutional neural network model as the image denoising model.

In a second aspect, an embodiment of the present application provides a denoising apparatus, which includes:

a first input module, configured for inputting an image to be processed into an image denoising model, wherein the image denoising model is a model obtained by training a convolutional neural network model based on a preset training set, and the preset training set includes multiple groups of annotation data and sample data corresponding to each group of annotation data: wherein, each group of annotation data includes multiple noiseless images obtained by performing motion simulation processing on one reference noiseless image, and the sample data corresponding to the group of annotation data includes images obtained by superimposing noise to the multiple noiseless images respectively: a first acquisition module, configured for acquiring denoised image data output by the image denoising model: a convert module, configured for converting the image data into an image, to obtain a denoised image corresponding to the image to be processed.

In one possible implementation, the apparatus further includes: a collecting module, configured for collecting multiple reference noiseless images: an extracting module, configured for: for each of the reference noiseless images, extracting multiple images that have a same shape, a same area, and an overlapping region, but are not completely identical, from the reference noiseless image, and taking the extracted images as one group of annotation data: a first superimposing module, configured for superimposing noise to the multiple images included in each group of annotation data respectively, to obtain the sample data corresponding to each group of annotation data: a first generating module, configured for generating the preset training set from the obtained multiple groups of annotation data and the sample data corresponding to each group of annotation data.

In one possible implementation, the apparatus further includes: a collecting module, configured for collecting multiple reference noiseless images: a first selecting module, configured for selecting two images each time from the multiple reference noiseless images as a foreground image and a background image respectively: a first cropping module, configured for cropping the background image according to a first specified shape and a first specified size: a first processing module, configured for cropping the foreground image according to the first specified shape and a second specified size, and masking the cropped foreground image to obtain a foreground image of a second specified shape: a first translating module, configured for superimposing the foreground image of the second specified shape on the cropped background image at a starting position of the cropped background image, translating the foreground image of the second specified shape on the background image in a preset direction at a preset speed, and taking images at multiple moments in the translation process as one group of annotation data: a second superimposing module, configured for superimposing noise to the multiple images included in each group of annotation data respectively, to obtain the sample data corresponding to each group of annotation data: a second generating module, configured for generating the preset training set from the obtained multiple groups of annotation data and the sample data corresponding to each group of annotation data.

In one possible implementation, the apparatus further includes: a second selecting module, configured for selecting two images each time from the multiple reference noiseless images as a foreground image and a background image respectively: a second cropping module, configured for cropping the background image according to a first specified shape and a first specified size: a second processing module, configured for cropping the foreground image according to the first specified shape and a second specified size, and masking the cropped foreground image to obtain a foreground image of a second specified shape, wherein the second specified size is less than the first specified size: a second translating module, configured for superimposing the foreground image of the second specified shape on the background image at a starting position of the background image, translating the foreground image of the second specified shape on the background image in a preset direction at a preset speed, and taking images at multiple moments in the translation process as one group of annotation data.

In one possible implementation, the extracting module is specifically configured for:

for each of the reference noiseless images, randomly selecting one position from the reference noiseless image as a starting crop coordinate: cropping the reference noiseless image at the starting crop coordinate to obtain a square having a specified side length as one cropped image: randomly offsetting the starting crop coordinate to obtain a next crop coordinate, and cropping the reference noiseless image at the next crop coordinate to obtain a square having a specified side length as one cropped image: obtaining one cropped image by cropping the reference noiseless image each time the crop coordinate is randomly offset, until a preset number of cropped images are obtained, and taking the preset number of cropped images as the group of annotation data.

In one possible implementation, the collecting module is specifically configured for: collecting multiple static RAW images captured by a capture device with a photosensibility set to a lowest value: for each of the static RAW images, processing the static RAW image with different brightness values to obtain the multiple reference noiseless images.

In one possible implementation, the apparatus further includes: a second input module, configured for: after splicing a first frame of image in one group of sample data included in the preset training set with itself, inputting the spliced image into the convolutional neural network model, and processing the spliced image successively by a first convolutional network and a second convolutional network included in the convolutional neural network model: a second acquisition module, configured for acquiring an intermediate denoised image output by the first convolutional network and a final denoised image output by the second convolutional network: a calculation module, configured for calculating a loss function value based on the final denoised image and the first frame of image: a determining module, configured for determining whether the convolutional neural network model converges according to the loss function value: if the convolutional neural network model does not converge, triggering an adjustment module to adjust parameters of the convolutional neural network model based on the loss function value, and splice a next frame of image in the group of sample data with the intermediate denoised image output by the first convolutional network last time, and triggering the second input module to perform the operation of inputting the spliced image into the convolutional neural network model until the determining module determines that the convolutional neural network model converges, then taking the trained convolutional neural network model as the image denoising model.

In a third aspect, an embodiment of the present application provides an electronic device, including a processor, communication interfaces, a memory and a communication bus, wherein the processor, the communication interfaces and the memory communicate with each other via the communication bus: the memory is configured for storing computer programs: the processor is configured for implementing any method in the above first aspect when executing the programs stored on the memory.

In a fourth aspect, an embodiment of the present application provides a computer readable storage medium having stored thereon computer programs which, when executed by a processor, cause the processor to implement any method in the above first aspect.

In a fifth aspect, an embodiment of the present application also provides a computer program product containing instructions which, when executed by a computer, cause the computer to implement any denoising method described above.

Using the embodiments of the present application, an image to be processed can be denoised through an image denoising model, and the image denoising model is obtained based on a preset training set, wherein the annotation data in the preset training set is multiple noiseless images obtained by performing motion simulation processing on one reference noiseless image, and the sample data corresponding to the annotation data includes the images obtained by superimposing noise to the multiple noiseless images respectively. It can be seen that the sample data and annotation data simulate image motion, so the image denoising model can learn how to denoise the multiple frames of images with noise and motion during the training process, so that the denoised image is closer to its corresponding noiseless image, so as to reduce the occurrence of ghost in the denoised image. Therefore, the image denoising model trained by the preset training set has the effect of removing ghost in the denoising process, so that the denoised image has no ghost and is clearer. It should be understood that any product or method for implementing the embodiments of the present application does not necessarily require all of the advantages described above.

BRIEF DESCRIPTION OF THE DRAWINGS

The drawings described herein are used to provide further understanding of the present application, and form a part of the present application. The exemplary embodiments and description herein are used to explain the present application and do not constitute improper limitations on the present application.

DETAILED DESCRIPTION

In order to make objectives, technical solutions and advantages of the present application more apparent, the present invention now will be described in detail with reference to the accompanying drawings and the detailed description. Obviously, the embodiments described are only some of the embodiments of the present application instead of all the embodiments. All other embodiments obtained by those of ordinary skills in the art based on the embodiments herein without any creative efforts are within the scope of the present invention.

Figure 1:
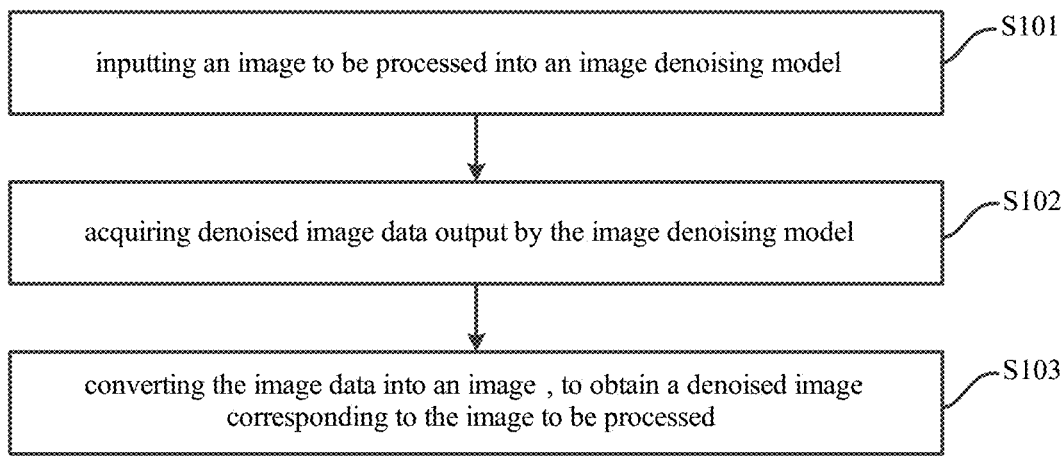
FIG. 1 is a flow diagram of a denoising method according to an embodiment of the present application.

In order to obtain a clearer denoised image or video, the embodiments of the present application provide a denoising method, which can be applied to an electronic device, such as a desktop computer, a server, a tablet or a mobile phone with image processing capability. As shown in FIG. 1, the method includes the following operations.

S101, inputting an image to be processed into an image denoising model.

Wherein, the image denoising model is a model obtained by training a convolutional neural network model based on a preset training set, and the preset training set includes multiple groups of annotation data and sample data corresponding to each group of annotation data: wherein, each group of annotation data includes multiple noiseless images obtained by performing motion simulation processing on one reference noiseless image, and the sample data corresponding to the group of annotation data includes images obtained by superimposing noise to the multiple noiseless images respectively.

In other words, one group of annotation data corresponds to one group of sample data, and noiseless images in the group of annotation data correspond to noisy images in the group of sample data in one-to-one corresponding relations.

The image to be processed can be an image that needs to be denoised, which can be a photo or every frame of image of a video.

The image to be processed can also be multiple images collected continuously or multiple video frames in a video. When input to an image denoising model, multiple frames of images can be input to the image denoising model in sequence according to an image acquisition sequence, or multiple video frames are input to the image denoising model in sequence according to an arrangement sequence of video frames, to obtain denoised image data output by the image denoising model for each input image.

S102, acquiring denoised image data output by the image denoising model.

The image data output by the denoising model is RAW Image Format (RAW) data of the denoised image.

S103, converting the image data into an image, to obtain a denoised image corresponding to the image to be processed.

In the embodiment of this application, in order to present the best visual effect to the user, it is necessary to convert the image data into standard red green blue (SRGB) images. For example, the image data can be converted into SRGB images through an image signal processor (ISP) algorithm, that is, the denoised SRGB images can be obtained.

It can be understood that if a video needs to be denoised, each video frame of the video can be denoised separately to obtain a denoised video. That is, each video frame of the video can be taken as an image to be processed, and each image to be processed can be denoised by the method in FIG. 1 to obtain a denoised video.

Using the embodiments of the present application, the image to be processed can be denoised through the image denoising model, and the image denoising model is obtained based on the preset training set, wherein the annotation data in the preset training set is multiple noiseless images obtained by performing motion simulation processing on one reference noiseless image, and the sample data corresponding to the annotation data includes the images obtained by superimposing noise to the multiple noiseless images. It can be seen that the sample data and annotation data simulate image motion, so the image denoising model can learn how to denoise the multiple frames of images with noise and motion during the training process, so that the denoised image is closer to its corresponding noiseless image, so as to reduce the occurrence of ghost in the denoised image. Therefore, the image denoising model trained by the preset training set has the effect of removing ghost in the denoising process, so that the denoised image has no ghost and is clearer.

In order to realize the procedure of the method shown in FIG. 1, it is necessary to obtain an image denoising model by training first. In order to make the trained image denoising model capable of processing the images captured by a capture device in a motion scene, it is necessary to generate a sample image that can accurately simulate the camera motion. The methods of generating a training set are described below.

Figure 2:
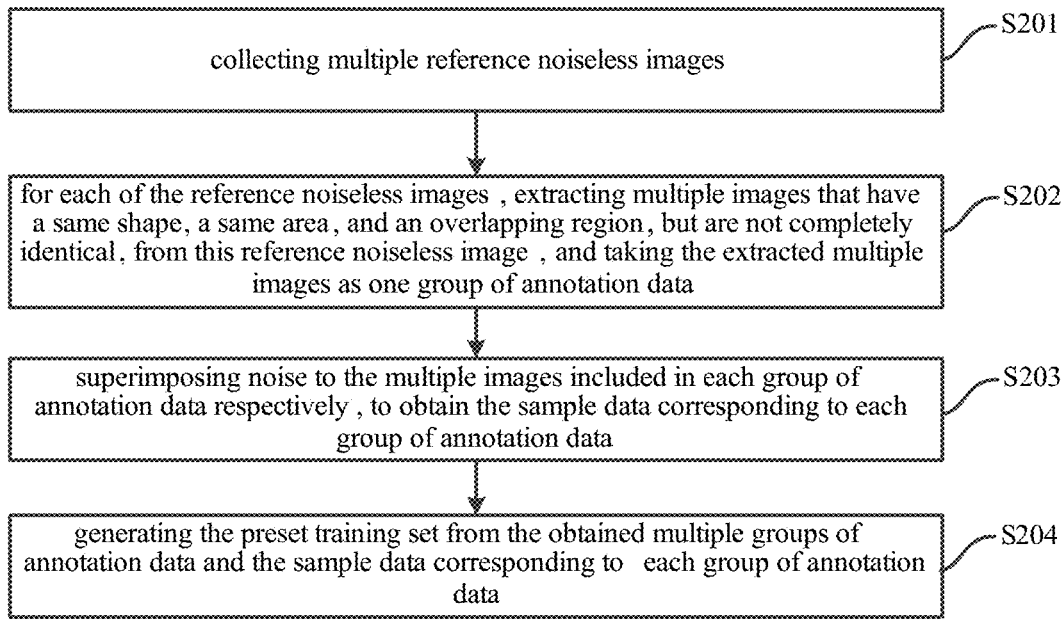
FIG. 2 is a flow diagram of another denoising method according to an embodiment of the present application.

In one implementation, in order to simulate the overall motion of the capture device during the image capturing process, such as camera shake, as shown in FIG. 2, the preset training set is obtained by the following operations:

S201, collecting multiple reference noiseless images.

In particular, this operation can be realized as follows: collecting multiple static RAW images captured by a capture device with a photosensibility set to a lowest value: for each of the static RAW images, processing the static RAW image with different brightness values to obtain the multiple reference noiseless images.

The photosensibility in the embodiment of the present application can be a photosensibility specified by the International Standards Organization (ISO).

When capturing an image, the lower the ISO value of the capture device is set, the lower the noise intensity of the captured image is.

Therefore, in the embodiment of the present application, in order to acquire reference noiseless images, multiple static RAW images captured by the capture device with the ISO value set to the lowest can be used as the reference noiseless images.

The capture device can be a device with image capturing function such as a smart phone, a digital camera, which is not specifically limited in the embodiment of the present application. Wherein the capture device and the above-mentioned electronic device can be the same device or different devices, which is not specifically limited in the embodiment of the present application.

In the embodiment of the present application, multiple static RAW images with fixed brightness can be captured, and then for each of the static RAW images, the static RAW image can be processed with different brightness values to obtain multiple reference noiseless images.

Due to a linear relationship between RAW domain data of the image and a light intensity, the reference noiseless image under various brightness can be obtained by the following formula:

$$gt_i = gt_0/\text{ratio}_i$$

wherein, $gt_0$ is data of the static RAW image captured under a fixed brightness of the image, ratio is a brightness ratio, ratio, can be an integer value such as 1, 2 or 3, which can be set according to actual requirements, and $gt_i$ is the reference noiseless image obtained after setting a brightness value.

The RAW domain data of the image has a linear relationship with the intensity of incident light, and the RAW domain noise can be modeled based on a physical imaging process, so the RAW domain data based on the image can well use supervised learning to train the convolutional neural network model, so as to obtain the image denoising model.

S202, for each of the reference noiseless images, extracting multiple images that have a same shape, a same area, and an overlapping region, but are not completely identical, from this reference noiseless image, and taking the extracted multiple images as one group of annotation data.

That is, the shapes and areas of multiple images extracted from the reference noiseless image are the same, and there is an overlapping region between any two images of the extracted images, and the area of the overlapping region is smaller than the area of one extracted image.

Wherein, for each reference noiseless image, a position can be randomly selected from the reference noiseless image as a starting crop coordinate. The reference noiseless image is cropped at the starting crop coordinate to obtain a square having a specified side length as one cropped image. For example, a starting crop coordinate is taken as a top left vertex of the cropped image or a center point of the cropped image, and a square image is obtained by crop according to the specified side length.

Wherein the specified side length can be expressed as PATCH_SIZE, which is an input size of a convolutional neural network kernel of the above image denoising model.

Then, the starting crop coordinate is randomly offset to obtain a next crop coordinate, and the reference noiseless image is cropped at the next crop coordinate to obtain a square having a specified side length as one cropped image.

Assuming that the starting crop coordinate is $(x_0, y_0)$, and the subsequent crop coordinate is $(x_i, y_i)$, then the subsequent crop coordinate is calculated by the following formula:

$$x_i = x_0 + \text{random\_x}$$
$$y_i = y_0 + \text{random\_y}.$$

wherein, random_x represents a random offset of abscissa $x_0$, random_y represents a random offset of ordinate $y_0$, and the random offset can be set by technicians.

Assuming that the reference noiseless image has a height of H and a width of W, in order to ensure that the cropped image will not offset out of the reference noiseless image, a value range of the abscissa and ordinate of the starting crop coordinate $(x_0, y_0)$ is:

$$\text{RANGE} \le x_0 \le W - 1 - \text{PATCH\_SIZE} - \text{RANGE}$$
$$\text{RANGE} \le y_0 \le H - 1 - \text{PATCH\_SIZE} - \text{RANGE}.$$

Wherein RANGE is the maximum value of a preset random offset, for example, RANGE can be 100.

One cropped image is obtained by cropping the reference noiseless image each time the crop coordinate is randomly offset, until a preset number of cropped images are obtained, and the preset number of cropped images are taken as the group of annotation data.

Figure 3:
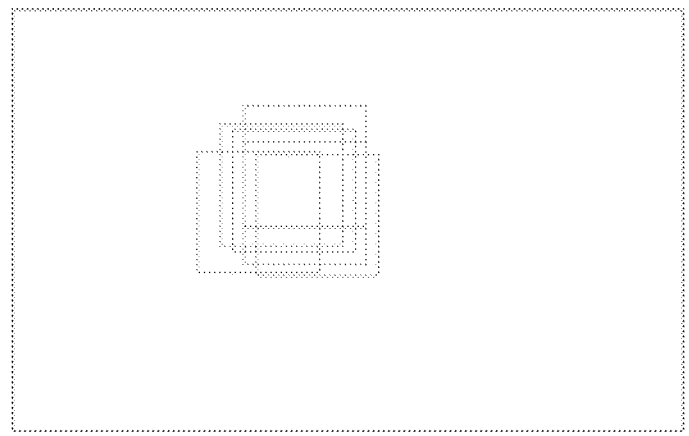
FIG. 3 is an exemplary schematic diagram of an image extracting method according to an embodiment of the present application.

FIG. 3 shows a schematic diagram of cropping an image in the above way. The outermost rectangle in FIG. 3 represents a reference noiseless image. Each square with the same size in the reference noiseless image is a cropped image. It can be seen from FIG. 3, there is an overlapping region between any two images of the multiple cropped images in FIG. 3, but these cropped images are not completely overlapped, which is equivalent to simulating multiple images or continuous video frames captured by a capture device when the capture device shakes, images that can simulate a real motion scene of the capture device can be obtained by using this method.

S203, superimposing noise to the multiple images included in each group of annotation data respectively, to obtain the sample data corresponding to each group of annotation data.

In the embodiment of the present application, the following formula is adopted to superimpose noise to the image in the annotation data:

$$\text{noise}_i = \text{possion}(gt_i) + \text{gaussian}.$$

wherein, noise_i represents image RAW data after superimposing noise, gt_i represents image RAW data without superimposing noise, and the function possion( ) represents superimposing Poisson noise, and gaussian represents superimposing Gaussian noise.

S204, generating the preset training set from the obtained multiple groups of annotation data and the sample data corresponding to each group of annotation data.

That is, each group of annotation data and the sample data in a one-to-one correspondence are taken as a preset training set.

Using this method, multiple reference noiseless images are collected in advance, multiple images that have a same shape, a same area, and an overlapping region, but are not completely identical, are extracted from each reference noiseless image, and the extracted multiple images are taken as one group of annotation data, which simulates the shaking of a camera when capturing images or videos, and then multiple groups of annotation data are processed by superimposing noise, which is equivalent to obtaining a noisy video frame sequence captured in the presence of capture device shaking, and the noisy video frame sequence is used as the sample data for training the convolutional neural network, which takes into account the camera shaking in the training model process, that is, taking into account the situation of image motion, so that the trained denoising model can denoise the video or image, and there is no ghost in the denoised video or image, which improves the denoising effect compared with the existing technology.

Figure 4:
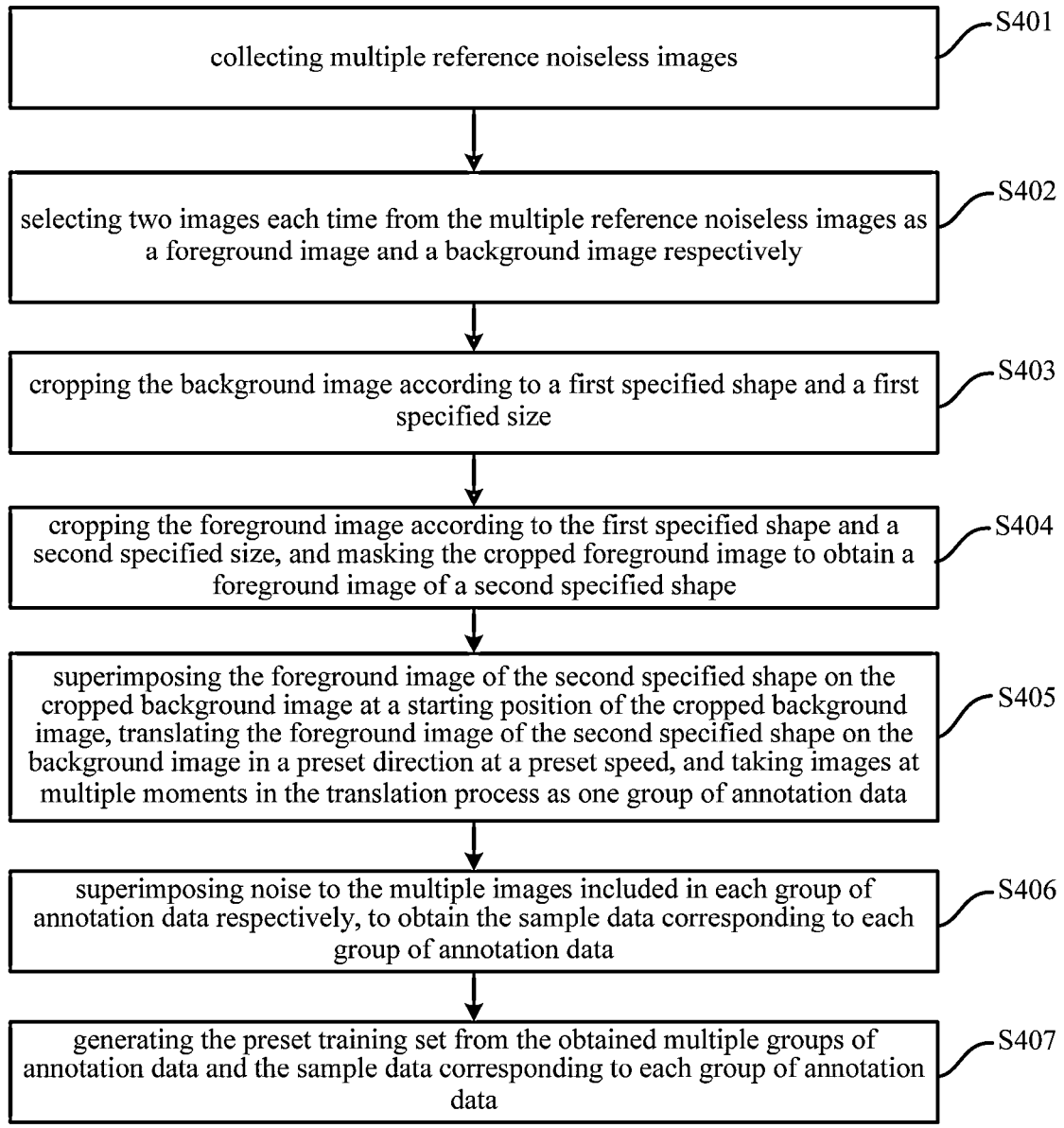
FIG. 4 is a flow diagram of another denoising method according to an embodiment of the present application.

In another implementation, in order to simulate the situation where a capture device is static, but a shot object is a moving object, as shown in FIG. 4, the preset training set is obtained by the following operations:

S401, collecting multiple reference noiseless images.

The process of collecting the reference noiseless images can refer to the description in S201 described above, which will not be repeated here.

S402, selecting two images each time from the multiple reference noiseless images as a foreground image and a background image respectively.

Two images can be selected randomly or in a certain sequence from multiple reference noiseless images, which is not limited in the embodiment of the present application. One of the selected images can be taken as a foreground image and the other image can be taken as a background image.

S403, cropping the background image according to a first specified shape and a first specified size.

Where, the first specified shape can be a rectangle, specifically a square, and correspondingly the first specified size is the side length of the square, which can be PATCH_SIZE that is an input size of a convolutional neural network kernel of the above image denoising model.

The background image can be cropped into a square image with a side length of PATCH_SIZE.

S404, cropping the foreground image according to the first specified shape and a second specified size, and masking the cropped foreground image to obtain a foreground image of a second specified shape.

Wherein the second size is far less than the first size. Assuming that the length and width of the cropped foreground image are w and h respectively, then w and h are far less than PATCH_SIZE.

The second specified shape can be a rectangle, an ellipse, a diamond, etc., or an irregular shape, such as a combination of multiple shapes such as a rectangle, an ellipse, a diamond, etc.

Since the shape of the moving object is usually irregular in the actual capturing process, and the cropped foreground image is rectangular, in order to simulate the shape of the moving object, it is necessary to mask the cropped image to obtain an irregular foreground image.

Figure 5:
FIG. 5 is an exemplary schematic diagram of image mask processing according to an embodiment of the present application.

As shown in FIG. 5, the position with the number "1" in FIG. 5 is a reserved pixel in the foreground image after the mask processing. The position with the number "0" is set to be transparent, which is equivalent to that the naked eye can only see the area with the number "1" in FIG. 5 after the mask processing.

The mask processing makes the foreground image closer to the shape of the real object, and makes the denoising model trained by the preset training set can better denoise the edge of the object in the image.

S405, superimposing the foreground image of the second specified shape on the cropped background image at a starting position of the cropped background image, translating the foreground image of the second specified shape on the background image in a preset direction at a preset speed, and taking images at multiple moments in the translation process as one group of annotation data.

Wherein, the foreground image of the second specified shape can be translated on the cropped background image, and the image at each moment in the translation process is a superimposed image of the foreground image of the second specified shape and the cropped background image.

Assuming that the starting position of the translation of the foreground image on the background image is $(x_0, y_0)$, the position $(x_i, y_i)$ of the subsequent image on the background image after translation can be calculated by the following formula:

$$x_i = x_0 + v * i$$
$$y_i = y_0 + v * i.$$

wherein v represents the preset speed, for example, v is a random integer between 0 and 40, i represents a moving moment.

In order to prevent the foreground image from moving out of the range of the background image, the position $(x_i, y_i)$ of the foreground image needs to meet the following conditions:

$$0 \le x_i \le \text{PATCH\_SIZE} - 1 - w$$
$$0 \le y_i \le \text{PATCH\_SIZE} - 1 - h$$

wherein, PATCH_SIZE is the side length of the background image, and w and h represent the width and height of the foreground image, respectively.

This ensures that the foreground image is translated always inside the background image.

Figure 6:
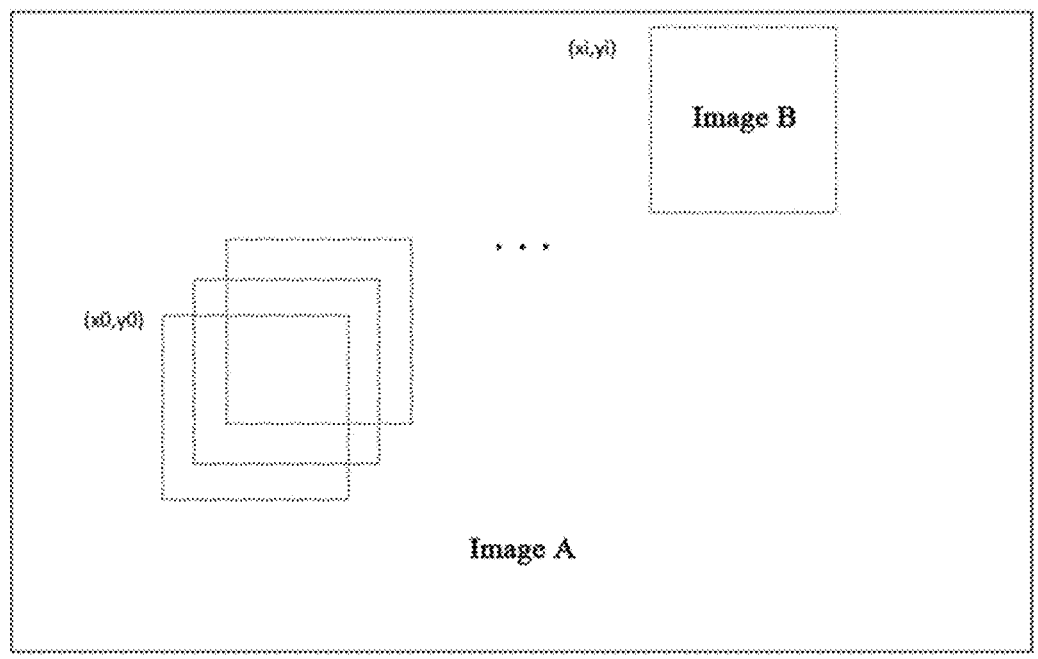
FIG. 6 is an exemplary schematic diagram of image translation according to an embodiment of the present application.

As shown in FIG. 6, the background image in FIG. 6 is image A. The foreground image is image B, and image B is translated inside image A according to the above method.

S406, superimposing noise to the multiple images included in each group of annotation data respectively, to obtain the sample data corresponding to each group of annotation data.

It can be understood that each time S402-S405 are executed, one group of annotation data can be obtained, and each time one group of annotation data is obtained, noise can be superimposed on multiple images included in the group of annotation data.

Wherein the noise superimposing method is consistent with that described in S203, which can refer to the relevant description in S203, and will not be repeated here.

S407, generating the preset training set from the obtained multiple groups of annotation data and the sample data corresponding to each group of annotation data.

That is, each group of annotation data and sample data in a one-to-one correspondence are taken as a preset training set.

Using this method, multiple reference noiseless images are collected in advance, two images are selected from the multiple reference noiseless images, the two images are cropped as a foreground image and a background image, the foreground image is superimposed on the cropped background image at the starting position and translated from the starting position, the images at multiple moments in the translation process are taken as one group of annotation data, and noise is superimposed to the annotation data, which is equivalent to obtaining a noisy video obtained by a static capture device for a moving object, i.e., the preset training set including the annotation data and the sample data corresponding to each group of annotation data. The image denoising model trained by the preset training set can effectively denoise the image or video including a moving object shot by a camera, without ghost.

Figure 7:
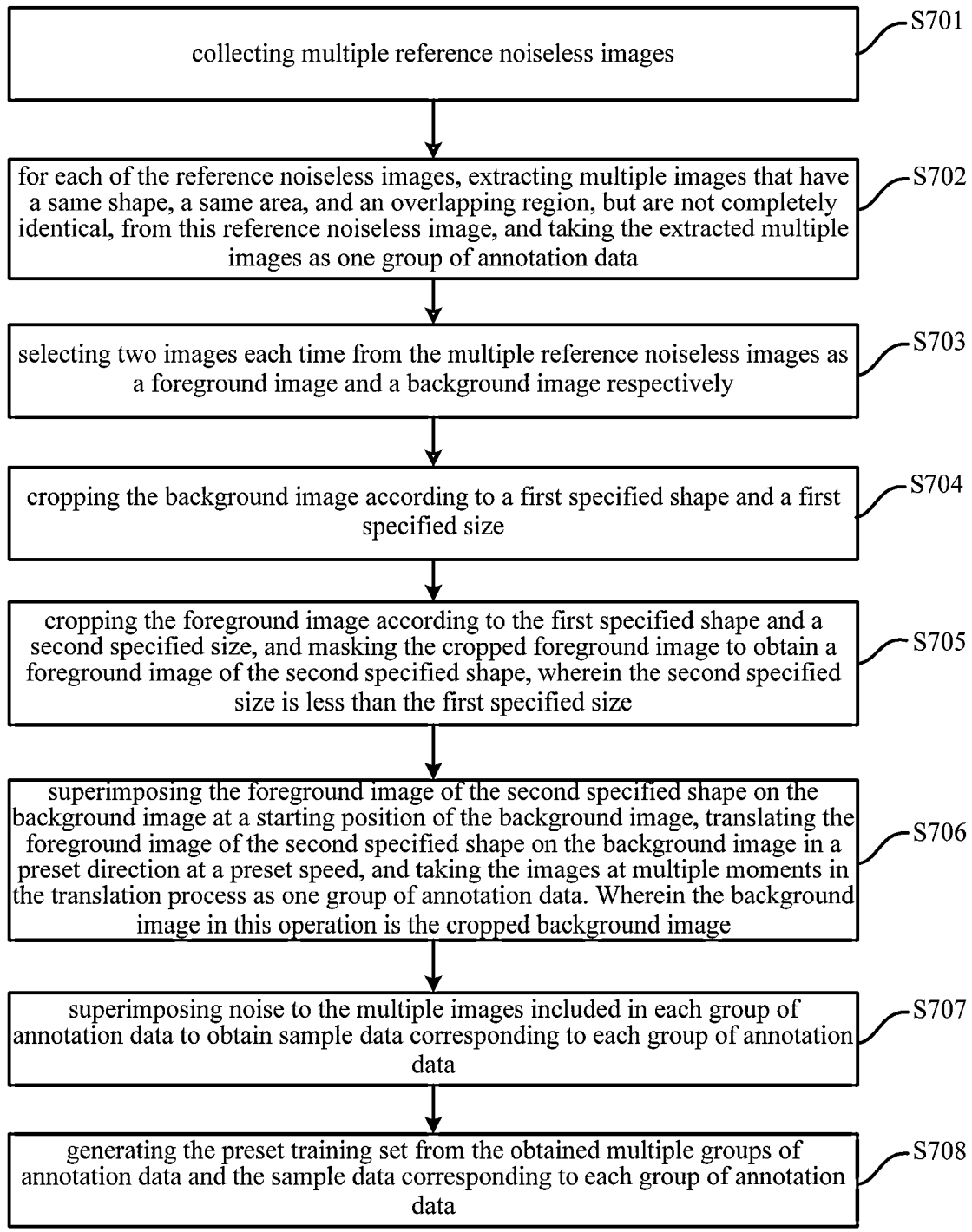
FIG. 7 is a flow diagram of another denoising method according to an embodiment of the present application.

In another implementation, as shown in FIG. 7, the preset training set can also be obtained by the following operations.

S701, collecting multiple reference noiseless images.

S702, for each of the reference noiseless images, extracting multiple images that have a same shape, a same area, and an overlapping region, but are not completely identical, from this reference noiseless image, and taking the extracted multiple images as one group of annotation data.

S701-S702 are consistent with S201-S202, and can refer to the relevant descriptions in S201-S202 above, which will not repeated here.

S703, selecting two images each time from the multiple reference noiseless images as a foreground image and a background image respectively.

S704, cropping the background image according to a first specified shape and a first specified size.

S705, cropping the foreground image according to the first specified shape and a second specified size, and masking the cropped foreground image to obtain a foreground image of the second specified shape, wherein the second specified size is less than the first specified size.

S706, superimposing the foreground image of the second specified shape on the background image at a starting position of the background image, translating the foreground image of the second specified shape on the background image in a preset direction at a preset speed, and taking the images at multiple moments in the translation process as one group of annotation data. Wherein the background image in this operation is the cropped background image.

The specific implementation of S703 to S706 is consistent with the above implementation of S402 to S405, which can refer to the relevant descriptions in the above implementation of S402 to S405, and will not be repeated here.

S707, superimposing noise to the multiple images included in each group of annotation data to obtain sample data corresponding to each group of annotation data. Wherein, the annotation data processed in this operation includes the annotation data obtained in S702 and the annotation data obtained in S706.

S708, generating the preset training set from the obtained multiple groups of annotation data and the sample data corresponding to each group of annotation data.

It should be noted that the embodiment of the present application provides two kinds of simulated motion scenes, that is, a scene in which the capture device shakes while the object being shot is static, and a scene in which the capture device is static while the object being shot moves. The preset training set can be obtained by simulating one of the motion scenes, or by simulating both of the motion scenes.

Using this method, multiple images that have a same shape, a same area, and an overlapping region, but are not completely identical, are extracted from the collected reference noiseless images, and the extracted multiple images are taken as one group of annotation data, which is equivalent to simulating a scene in which the capture device shakes while the object being shot is static: two images are selected from the multiple reference noiseless images as a foreground image and a background image respectively, the foreground image is translated on the background image, which is equivalent to simulating a scene in which the capture device is static while the object being shot moves. That is to say, the final preset training set is obtained by simulating both of the two motion scenes, and then, the image denoising model trained with the preset training set can better process the images or videos captured by the capture device under various motion situations, that is, the image denoising model can learn how to denoise the multiple frames of noisy images in various scenes during the training, so that each of the denoised images is closer to its corresponding noiseless image, so as to reduce the occurrence of ghosting in the denoised image, and improve denoising and ghost removing capabilities.

Figure 8:
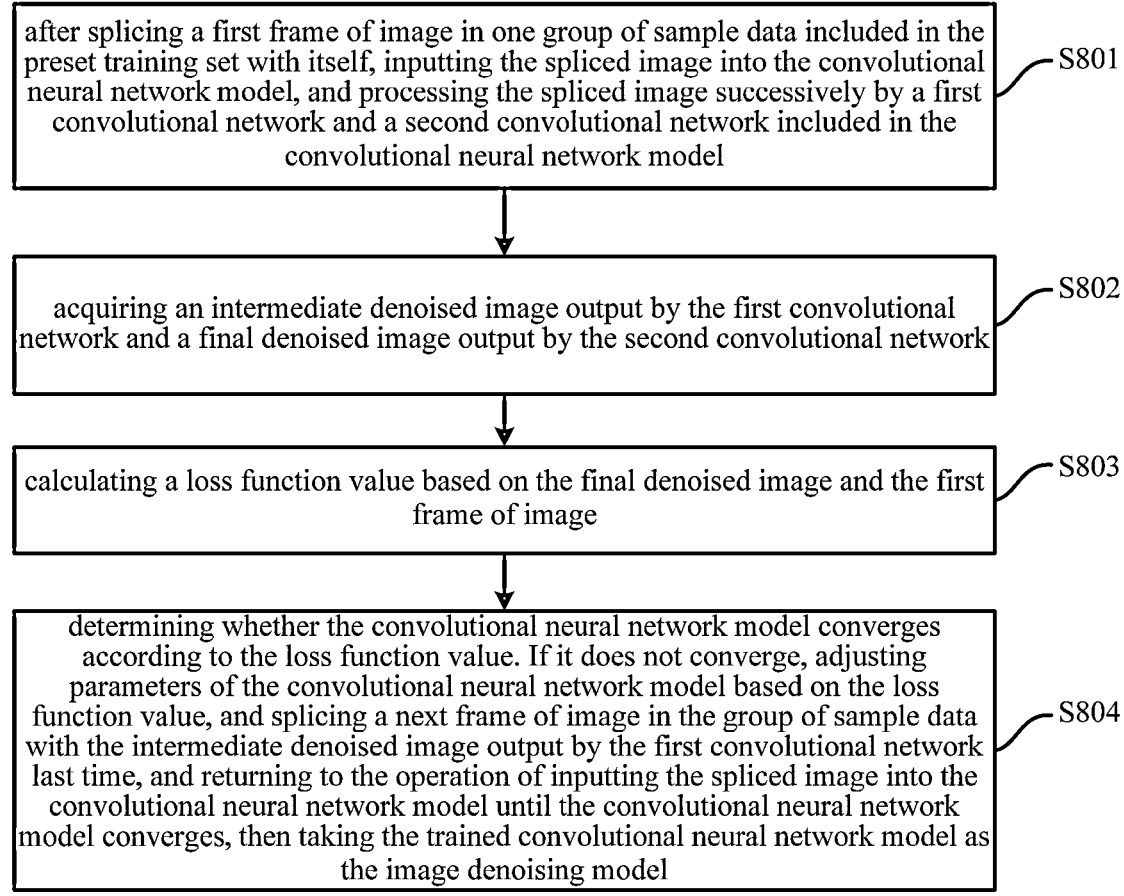
FIG. 8 is a flow diagram of another denoising method according to an embodiment of the present application.

In another embodiment of the present application, as shown in FIG. 8, the image denoising model is trained by the following operations.

S801, after splicing a first frame of image in one group of sample data included in the preset training set with itself, inputting the spliced image into the convolutional neural network model, and processing the spliced image successively by a first convolutional network and a second convolutional network included in the convolutional neural network model.

Wherein, multiple images included in one group of sample data are obtained by processing the same reference noiseless image, therefore, one group of sample data can be regarded as a video frame sequence, and the first image in the group of sample data is a first frame of image.

S802, acquiring an intermediate denoised image output by the first convolutional network and a final denoised image output by the second convolutional network.

Figure 9:
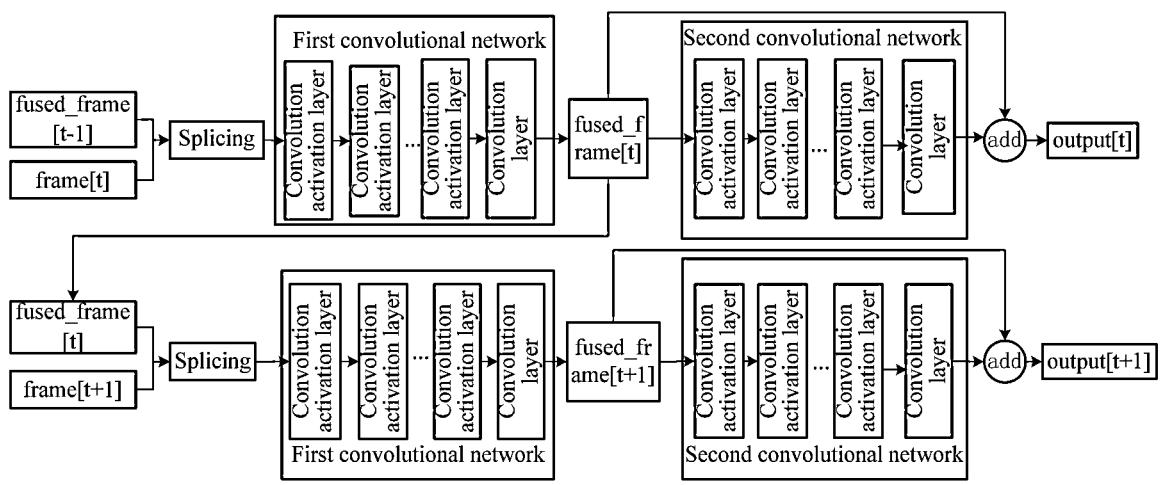
FIG. 9 is a structural diagram of a convolutional neural network according to an embodiment of the present application.

In the embodiment of the present application, as shown in FIG. 9, the convolutional neural network model includes a first convolutional network and a second convolutional network. Wherein, the first convolutional network at least includes a convolution activation layer and a convolution layer, and the second convolutional network at least includes a convolution activation layer and a convolution layer. The embodiment of the present application does not limit the specific structure of the first convolutional network and the second convolutional network. Wherein, the first convolutional network may output an intermediate denoised image when processing the current frame of image, that is, the image obtained by partially denoising the current frame of image. The final denoised image is the image obtained by the first and second convolutional network that perform denoising processing on the current frame of image.

As shown in FIG. 9, frame[t] represents the t-th frame of image in one group of annotation data, fused_Frame[t−1] represents an intermediate denoised image of the (t−1)-th frame of image, and frame[t] and fused_frame[t−1] are spliced and input into the first convolutional network to obtain an intermediate denoised image fused_frame[t] for the t-th frame of image, and then fuse_frame[t] is input to the second convolutional network, and then the output result of the second convolutional network is added with fused_frame[t] to finally obtain the output result output[t], that is, the final denoised image after frame [t] is denoised.

When inputting the (t+1)-th frame of image frame[t+1] in the group of annotation data into the convolutional neural network model, fused_frame[t] and frame[t+1] are spliced, and the spliced result is input into the first convolutional network to obtain the intermediate denoised image fused_frame[t+1] for the (t+1)-th frame of image, then fuse_frame[t+1] is input into the second convolutional network, and then the output result of the second convolutional network is added with fused_frame[t+1] to obtain the final output result output[t+1], that is, the final denoised image after frame[t+1] is denoised.

It should be noted that when t=0, that is, when the first frame is input, since there is no intermediate denoised image of a previous frame, the first frame is spliced with itself during splicing.

For the convenience of understanding, FIG. 9 shows a processing process of the convolutional neural network model for two consecutive frames of images. In practical applications, the convolutional neural network model in the embodiment of the present application only includes a first convolutional network and a second convolutional network in FIG. 9.

S803, calculating a loss function value based on the final denoised image and the first frame of image.

In the embodiment of the present application, the final denoised image is a denoised image obtained after an image in the sample data of the preset training set input into the convolutional neural network model at this time is processed by the convolutional neural network model.

The calculation formula of loss function value is:

$$\text{loss} = |\text{output} - gt_i|,$$

wherein, loss represents the loss function value, output represents RAW data of the final denoised image output by the convolutional neural network model, and gt_i represents RAW data of the image in the annotation data corresponding to the input image in the sample data in the preset training set.

For example, if the image input at this time is the first frame of image in one group of sample data, the loss function value between the final denoised image and the RAW data of the image in the annotation data corresponding to the first frame of image can be calculated.

S804, determining whether the convolutional neural network model converges according to the loss function value. If it does not converge, adjusting parameters of the convolutional neural network model based on the loss function value, and splicing a next frame of image in the group of sample data with the intermediate denoised image output by the first convolutional network last time, and returning to the operation of inputting the spliced image into the convolutional neural network model until the convolutional neural network model converges, then taking the trained convolutional neural network model as the image denoising model.

In the embodiment of the present application, when training the convolutional neural network model, when using the convolutional neural network model to denoise each image, the image and the intermediate denoised image of a previous image are spliced and input into the convolutional neural network model, and the adjacent two frames of images can reflect the motion of the capture device or the object being shot, there will be a ghost after splicing the image and the intermediate denoised image of the previous image. However, the annotation image corresponding to the image is ghostless and noiseless, the loss function value of the final denoised image of the spliced image and the ghostless and noiseless annotation image can be calculated based on the convolutional neural network, so that the trained image denoising model can remove ghost and noise in the image, and obtain a clearer denoised image.

It can be understood that in the process of applying the image denoising model, if an image to be processed is a frame in the video frame sequence, the image to be processed and the intermediate denoising result of the previous frame of image are spliced and input into the image denoising model, and then the image data after denoising the image to be processed output by the image denoising model can be obtained. According to this method, the image data after denoising each frame of image in the video frame sequence can be obtained, and then the denoised video can be obtained.

If the image to be processed is a static image, the image to be processed are spliced with itself and input into the image denoising model, and then the image data after denoising the image to be processed output by the image denoising model can be obtained.

Figure 10:
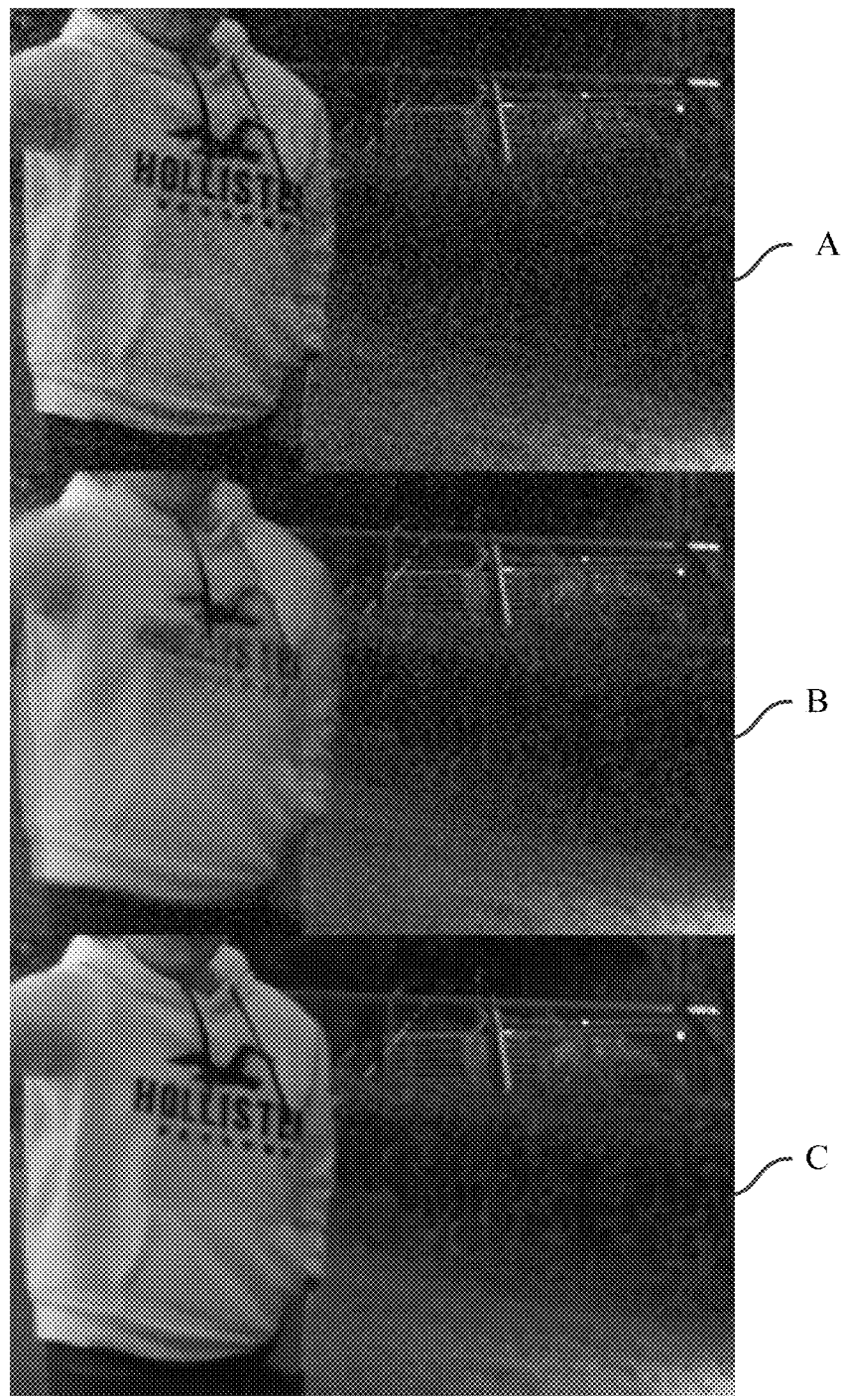
FIG. 10 is an exemplary schematic diagram illustrating the comparison of image denoising effects according to an embodiment of the present application.

As shown in FIG. 10, image A in FIG. 10 is an original noisy image captured by the user at time t.

Image B is an image obtained by using the existing denoising method of superimposing the average value on multiple frames of images for denoising image A, that is, the denoised image at moment t obtained by superimposing the average value of five frames of images captured by the user at moments t−2, t−1, t, t+1, t+2. It can be seen that compared with image A, image B has denoising effects in the static background part of the image, but for the foreground part of the image, that is, a moving human picture in the image, there is a serious ghosting problem.

Image C is an image after denoising image A by using the denoising model provided by the present application. In image C, both the static background part and the moving foreground human picture have good denoising effects, and there is no ghosting problem in the foreground human picture part. It can be seen that compared with the existing technology, the denoising model provided by the present application can denoise the image very well and will not have a ghosting problem.

Figure 11:
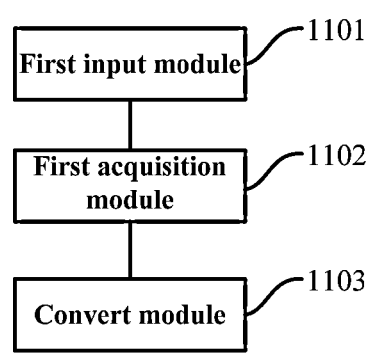
FIG. 11 is a schematic structural diagram of a denoising apparatus according to an embodiment of the present application.

Corresponding to the method embodiment described above, an embodiment of the present application further provides an image denoising apparatus, as shown in FIG. 11, the apparatus includes:
a first input module 1101, configured for inputting an image to be processed into an image denoising model, wherein the image denoising model is a model obtained by training a convolutional neural network model based on a preset training set, and the preset training set includes multiple groups of annotation data and sample data corresponding to each group of annotation data: wherein, each group of annotation data includes multiple noiseless images obtained by performing motion simulation processing on one reference noiseless image, and the sample data corresponding to the group of annotation data includes images obtained by superimposing noise to the multiple noiseless images respectively:
a first acquisition module 1102, configured for acquiring denoised image data output by the image denoising model:
a convert module 1103, configured for converting the image data into an image, to obtain a denoised image corresponding to the image to be processed.

In another embodiment of the present application, the apparatus further includes: a collecting module, configured for collecting multiple reference noiseless images: an extracting module, configured for: for each of the reference noiseless images, extracting multiple images that have a same shape, a same area, and an overlapping region, but are not completely identical, from the reference noiseless image, and taking the extracted images as one group of annotation data: a first superimposing module, configured for superimposing noise to the multiple images included in each group of annotation data respectively, to obtain the sample data corresponding to each group of annotation data: a first generating module, configured for generating the preset training set from the obtained multiple groups of annotation data and the sample data corresponding to each group of annotation data.

In another embodiment of the present application, the apparatus further includes: a collecting module, configured for collecting multiple reference noiseless images: a first selecting module, configured for selecting two images each time from the multiple reference noiseless images as a foreground image and a background image respectively: a first cropping module, configured for cropping the background image according to a first specified shape and a first specified size: a first processing module, configured for cropping the foreground image according to the first specified shape and a second specified size, and masking the cropped foreground image to obtain a foreground image of a second specified shape: a first translating module, configured for superimposing the foreground image of the second specified shape on the cropped background image at a starting position of the cropped background image, translating the foreground image of the second specified shape on the background image in a preset direction at a preset speed, and taking images at multiple moments in the translation process as one group of annotation data: a second superimposing module, configured for superimposing noise to the multiple images included in each group of annotation data respectively, to obtain the sample data corresponding to each group of annotation data: a second generating module, configured for generating the preset training set from the obtained multiple groups of annotation data and the sample data corresponding to each group of annotation data.

In another embodiment of the present application, the apparatus further includes:
- a second selecting module, configured for selecting two images each time from the multiple reference noiseless images as a foreground image and a background image respectively:
- a second cropping module, configured for cropping the background image according to a first specified shape and a first specified size:
- a second processing module, configured for cropping the foreground image according to the first specified shape and a second specified size, and masking the cropped foreground image to obtain a foreground image of a second specified shape, wherein the second specified size is less than the first specified size:
- a second translating module, configured for superimposing the foreground image of the second specified shape on the background image at a starting position of the background image, translating the foreground image of the second specified shape on the background image in a preset direction at a preset speed, and taking images at multiple moments in the translation process as one group of annotation data.

In another embodiment of the present application, the extracting module is specifically configured for:
- for each of the reference noiseless images, randomly selecting one position from the reference noiseless image as a starting crop coordinate:
- cropping the reference noiseless image at the starting crop coordinate to obtain a square having a specified side length as one cropped image:
- randomly offsetting the starting crop coordinate to obtain a next crop coordinate, and cropping the reference noiseless image at the next crop coordinate to obtain a square having a specified side length as one cropped image:
- obtaining one cropped image by cropping the reference noiseless image each time the crop coordinate is randomly offset, until a preset number of cropped images are obtained, and taking the preset number of cropped images as the group of annotation data.

In another embodiment of the present application, the collecting module is specifically configured for:
- collecting multiple static RAW images captured by a capture device with a photosensibility set to a lowest value: for each of the static RAW images, processing the static RAW image with different brightness values to obtain the multiple reference noiseless images.

In another embodiment of the present application, the apparatus further includes:
- a second input module, configured for: after splicing a first frame of image in one group of sample data included in the preset training set with itself, inputting the spliced image into the convolutional neural network model, and processing the spliced image successively by a first convolutional network and a second convolutional network included in the convolutional neural network model:
- a second acquisition module, configured for acquiring an intermediate denoised image output by the first convolutional network and a final denoised image output by the second convolutional network:
- a calculation module, configured for calculating a loss function value based on the final denoised image and the first frame of image:
- a determining module, configured for determining whether the convolutional neural network model converges according to the loss function value: if the convolutional neural network model does not converge, triggering an adjustment module to adjust parameters of the convolutional neural network model based on the loss function value, and splice a next frame of image in the group of sample data with the intermediate denoised image output by the first convolutional network last time, and triggering the second input module to perform the operation of inputting the spliced image into the convolutional neural network model until the determining module determines that the convolutional neural network model converges, then taking the trained convolutional neural network model as the image denoising model.

Figure 12:
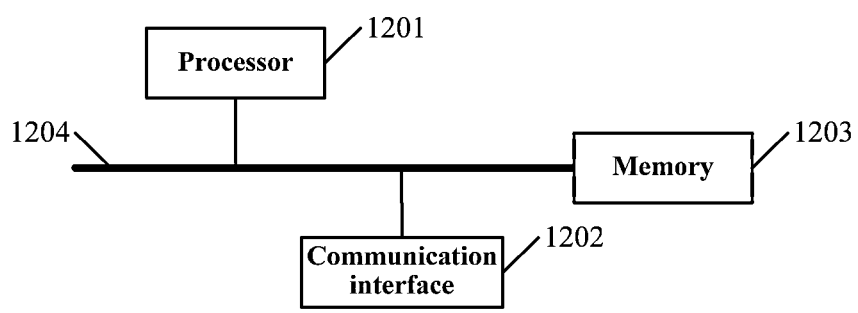
FIG. 12 is a schematic structural diagram of an electronic device according to an embodiment of the present application.

The embodiment of the present application also provides an electronic device, as shown in FIG. 12, the electronic device includes a processor 1201, a communication interface 1202, a memory 1203 and a communication bus 1204, wherein the processor 1201, the communication interface 1202 and the memory 1203 communicate with each other through the communication bus 1204; the memory 1203 is configured for storing computer programs: the processor 1201 is configured for implementing method of any of the above first aspect when executing the programs stored on the memory 1203.

The communication bus aforementioned in the electronic device may be a peripheral component interconnect (PCI) bus or an extended industry standard architecture (EISA) bus and the like. The communication bus can include an address bus, a data bus, a control bus, or the like. For representation, only one thick line is shown in the figure, which does not mean there is only one communication bus or one type of communication bus, the communications interface is configured for communication between the aforementioned electronic device and other devices.

The memory can include a random access memory (RAM), or can include a non-volatile memory (NVM), for example at least one disk memory. Optionally, the memory can also be at least one storage device located away from the processor described above.

The aforementioned processor can be a general-purpose processor, such as a central processing unit (CPU), a network processor (NP), or the like: it can also be a digital signal processor (DSP), an application specific integrated circuit (ASIC), a field-programmable gate array (FPGA) or other programmable logic device, a discrete gate or transistor logic device, a discrete hardware component.

In another embodiment of the present application, it is also provided a computer readable storage medium having stored thereon computer programs which, when executed by a processor, cause the processor to implement any of the above denoising methods.

In still another embodiment of the present invention, there is also provided a computer program product containing instructions which, when being executed by a computer, cause the computer to implement the denoising method of any of the above embodiments.

In the aforementioned embodiments, it may be implemented in whole or in part by software, hardware, firmware, or any combination thereof. When implemented by software, it may be implemented in whole or in part in the form of a computer program product. The computer program product includes one or more computer instructions. The processes or functions described in accordance with the embodiments of the present invention is produced in whole or in part, when the computer program instructions are loaded and executed on a computer. The computer may be a general-purpose computer, a dedicated computer, a computer network, or other programmable device. The computer instructions may be stored in a computer-readable storage medium or may be transmitted from one computer-readable storage medium to another computer-readable storage medium, for example, the computer instructions may be transmitted from a web site, a computer, a server, or a data center to another web site, another computer, another server, or another data center via a cable (such as a coaxial cable, an optical fiber, a digital subscriber line (DSL)) or wireless (such as infrared, wireless, microwave, etc.). The computer-readable storage medium may be any available medium that may be accessed by a computer or a data storage device such as a server or a data center containing one or more available medium integrations. The available media may be magnetic media (such as floppy disks, hard disks, magnetic tapes), optical media (such as DVDs), or semiconductor media (such as solid state disk (SSD)), etc.

It should be noted that, the relationship terms herein such as "first", "second" and the like are only used to distinguish one entity or operation from another entity or operation, but do not necessarily require or imply that there is actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

All the embodiments are described in corresponding ways, same or similar parts in each of the embodiments can be referred to one another, and the parts emphasized are differences to other embodiments. Especially for embodiments of a device, since they are similar to embodiments of a method, the description thereof is relatively simple: the relating parts could refer to the parts of the description of embodiments of the method.

The description is only for preferred embodiments of the present application, and embodiments are not so limited. Any modifications, substitutions, improvements, etc., which are made within the spirit and principles of the present application, will fall into the protection scope of the present application.

What is claimed is:

1. A denoising method, comprising:
    inputting an image to be processed into an image denoising model, wherein the image denoising model is a model obtained by training a convolutional neural network model based on a preset training set, and the preset training set comprises multiple groups of annotation data and sample data corresponding to each group of annotation data; wherein, each group of annotation data comprises multiple noiseless images obtained by performing motion simulation processing on one reference noiseless image, and the sample data corresponding to the group of annotation data comprises images obtained by superimposing noise to the multiple noiseless images respectively;
    acquiring denoised image data output by the image denoising model; and
    converting the image data into an image, to obtain a denoised image corresponding to the image to be processed;
    wherein the preset training set is obtained by the following operations:
    collecting multiple reference noiseless images;
    for each of the reference noiseless images, extracting multiple images that have a same shape, a same area, and an overlapping region, but are not completely identical, from this reference noiseless image, and taking the extracted images as one group of annotation data;
    superimposing noise to the multiple images comprised in each group of annotation data respectively, to obtain the sample data corresponding to each group of annotation data; and
    generating the preset training set from the obtained multiple groups of annotation data and the sample data corresponding to each group of annotation data.

2. The method of claim 1, wherein the preset training set is obtained by the following operations:
    collecting multiple reference noiseless images;
    selecting two images each time from the multiple reference noiseless images as a foreground image and a background image respectively;
    cropping the background image according to a first specified shape and a first specified size;
    cropping the foreground image according to the first specified shape and a second specified size, and masking the cropped foreground image to obtain a foreground image of a second specified shape;
    superimposing the foreground image of the second specified shape on the cropped background image at a starting position of the cropped background image, translating the foreground image of the second specified shape on the background image in a preset direction at a preset speed, and taking images at multiple moments in the translation process as one group of annotation data;
    superimposing noise to the multiple images comprised in each group of annotation data respectively, to obtain the sample data corresponding to each group of annotation data;
    generating the preset training set from the obtained multiple groups of annotation data and the sample data corresponding to each group of annotation data.

3. The method of claim 1, wherein before generating the preset training set from the obtained multiple groups of annotation data and the sample data corresponding to each group of annotation data, the method further comprises:
    selecting two images each time from the multiple reference noiseless images as a foreground image and a background image respectively;
    cropping the background image according to a first specified shape and a first specified size;
    cropping the foreground image according to the first specified shape and a second specified size, and masking the cropped foreground image to obtain a foreground image of a second specified shape, wherein the second specified size is less than the first specified size;
    superimposing the foreground image of the second specified shape on the background image at a starting position of the background image, translating the foreground image of the second specified shape on the background image in a preset direction at a preset speed, and taking images at multiple moments in the translation process as one group of annotation data.

4. The method of claim 1, wherein for each of the reference noiseless images, extracting the multiple images that have a same shape, a same area, and an overlapping region, but are not completely identical, from the reference noiseless image, and taking the extracted multiple images as the one group of annotation data, comprises:
- for each of the reference noiseless images, randomly selecting one position from the reference noiseless image as a starting crop coordinate;
- cropping the reference noiseless image at the starting crop coordinate to obtain a square having a specified side length as one cropped image;
- randomly offsetting the starting crop coordinate to obtain a next crop coordinate, and cropping the reference noiseless image at the next crop coordinate to obtain a square having a specified side length as one cropped image;
- obtaining one cropped image by cropping the reference noiseless image each time the crop coordinate is randomly offset, until a preset number of cropped images are obtained, and taking the preset number of cropped images as the one group of annotation data.

5. The method of claim 1, wherein collecting the multiple reference noiseless images comprises:
- collecting multiple static RAW images captured by a capture device with a photosensibility set to a lowest value;
- for each of the static RAW images, processing the static RAW image with different brightness values to obtain the multiple reference noiseless images.

6. The method of claim 1, wherein the image denoising model is trained by the following operations:
- after splicing a first frame of image in one group of sample data comprised in the preset training set with itself, inputting the spliced image into the convolutional neural network model, and processing the spliced image successively by a first convolutional network and a second convolutional network comprised in the convolutional neural network model;
- acquiring an intermediate denoised image output by the first convolutional network and a final denoised image output by the second convolutional network;
- calculating a loss function value based on the final denoised image and the first frame of image;
- determining whether the convolutional neural network model converges according to the loss function value;
- if the convolutional neural network model does not converge, adjusting parameters of the convolutional neural network model based on the loss function value, and splicing a next frame of image in the one group of sample data with the intermediate denoised image output by the first convolutional network last time, and returning to the operation of inputting the spliced image into the convolutional neural network model until the convolutional neural network model converges, then taking the trained convolutional neural network model as the image denoising model.

7. A non-transitory computer readable storage medium having stored thereon computer programs which, when executed by a processor, cause the processor to implement the method of claim 1.

8. An electronic device, comprising a processor, communication interfaces, a memory and a communication bus, wherein the processor, the communication interfaces and the memory communicate with each other via the communication bus;
- the memory is configured for storing computer programs;
- the processor is configured for when executing the programs stored on the memory, implementing operations of:
  - inputting an image to be processed into an image denoising model, wherein the image denoising model is a model obtained by training a convolutional neural network model based on a preset training set, and the preset training set comprises multiple groups of annotation data and sample data corresponding to each group of annotation data; wherein, each group of annotation data comprises multiple noiseless images obtained by performing motion simulation processing on one reference noiseless image, and the sample data corresponding to the group of annotation data comprises images obtained by superimposing noise to the multiple noiseless images respectively;
  - acquiring denoised image data output by the image denoising model; and
  - converting the image data into an image, to obtain a denoised image corresponding to the image to be processed;
- wherein the preset training set is obtained by the following operations:
  - collecting multiple reference noiseless images;
  - for each of the reference noiseless images, extracting multiple images that have a same shape, a same area, and an overlapping region, but are not completely identical, from this reference noiseless image, and taking the extracted images as one group of annotation data;
  - superimposing noise to the multiple images comprised in each group of annotation data respectively, to obtain the sample data corresponding to each group of annotation data; and
  - generating the preset training set from the obtained multiple groups of annotation data and the sample data corresponding to each group of annotation data.

9. The electronic device of claim 8, wherein the processor is further configured for when executing the programs stored on the memory, implementing operations of:
- collecting multiple reference noiseless images;
- selecting two images each time from the multiple reference noiseless images as a foreground image and a background image respectively;
- cropping the background image according to a first specified shape and a first specified size;
- cropping the foreground image according to the first specified shape and a second specified size, and masking the cropped foreground image to obtain a foreground image of a second specified shape;
- superimposing the foreground image of the second specified shape on the cropped background image at a starting position of the cropped background image, translating the foreground image of the second specified shape on the background image in a preset direction at a preset speed, and taking images at multiple moments in the translation process as one group of annotation data;
- superimposing noise to the multiple images comprised in each group of annotation data respectively, to obtain the sample data corresponding to each group of annotation data; and
- generating the preset training set from the obtained multiple groups of annotation data and the sample data corresponding to each group of annotation data.

10. The electronic device of claim 8, wherein the processor is further configured for when executing the programs stored on the memory, before generating the preset training set from the obtained multiple groups of annotation data and the sample data corresponding to each group of annotation data, implementing operations of:

selecting two images each time from the multiple reference noiseless images as a foreground image and a background image respectively;

cropping the background image according to a first specified shape and a first specified size;

cropping the foreground image according to the first specified shape and a second specified size, and masking the cropped foreground image to obtain a foreground image of a second specified shape, wherein the second specified size is less than the first specified size; and superimposing the foreground image of the second specified shape on the background image at a starting position of the background image, translating the foreground image of the second specified shape on the background image in a preset direction at a preset speed, and taking images at multiple moments in the translation process as one group of annotation data.

11. The electronic device of claim 8, wherein the processor is further configured for when executing the programs stored on the memory, implementing operations of:

for each of the reference noiseless images, randomly selecting one position from the reference noiseless image as a starting crop coordinate;

cropping the reference noiseless image at the starting crop coordinate to obtain a square having a specified side length as one cropped image;

randomly offsetting the starting crop coordinate to obtain a next crop coordinate, and cropping the reference noiseless image at the next crop coordinate to obtain a square having a specified side length as one cropped image; and obtaining one cropped image by cropping the reference noiseless image each time the crop coordinate is randomly offset, until a preset number of cropped images are obtained, and taking the preset number of cropped images as the group of annotation data.

12. The electronic device of claim 8, wherein the processor is further configured for when executing the programs stored on the memory, implementing operations of:

collecting multiple static RAW images captured by a capture device with a photosensibility set to a lowest value; and for each of the static RAW images, processing the static RAW image with different brightness values to obtain the multiple reference noiseless images.

13. The electronic device of claim 8, wherein the processor is further configured for when executing the programs stored on the memory, implementing operations of:

after splicing a first frame of image in one group of sample data comprised in the preset training set with itself, inputting the spliced image into the convolutional neural network model, and processing the spliced image successively by a first convolutional network and a second convolutional network comprised in the convolutional neural network model;

acquiring an intermediate denoised image output by the first convolutional network and a final denoised image output by the second convolutional network;

calculating a loss function value based on the final denoised image and the first frame of image; and determining whether the convolutional neural network model converges according to the loss function value; if the convolutional neural network model does not converge, triggering an adjustment module to adjust parameters of the convolutional neural network model based on the loss function value, and splice a next frame of image in the group of sample data with the intermediate denoised image output by the first convolutional network last time, and triggering the second input module to perform the operation of inputting the spliced image into the convolutional neural network model until the determining module determines that the convolutional neural network model converges, then taking the trained convolutional neural network model as the image denoising model.

* * * * *